July 2, 1957 E. R. ORSATTI 2,798,147
LIGHT-REFLECTING LENS
Filed May 24, 1952

INVENTOR.
ERNEST R. ORSATTI
BY Fulwider & Mattingly
Attorneys

United States Patent Office 2,798,147
Patented July 2, 1957

2,798,147

LIGHT-REFLECTING LENS

Ernest R. Orsatti, Malibu Beach, Calif., assignor, by direct and mesne assignments, of one-third to J. G. Moser and one-third to Lee W. Hoggan, Los Angeles, Calif.

Application May 24, 1952, Serial No. 289,791

11 Claims. (Cl. 240—2.25)

My invention relates generally to light-transmissive and refractive lenses having light-reflective characteristics. Such lenses are particularly useful in warning and indicating lights that normally are continuously or intermittently illuminated, but which should act at least as a reflector in the event that the normal light source fails.

On construction projects where barricades or other obstructions must be placed, it has long been the practice to locate flares or other illuminated warning devices near the barricades so that motorists and even pedestrians will be warned of the potential danger. Flares, of course, are subject to being blown out, and even electric lights can burn out or have the source of power fail. To take care of the possibility that the light source may fail, it is customary to provide light-reflective warning devices in addition to the warning lights themselves. These reflector warning devices may be of the type having a series of prisms or similar members formed on the surface of a refracting medium, such as plastic, and the prisms are so arranged that light striking the device passes through the refracting medium and is reflected at the rear surface of that medium.

Recently, warning devices have been developed wherein a gaseous conduction electrical discharge tube is intermittently energized by a high voltage power source, the source consisting of a low voltage battery, an interrupter, generally of the magnetic type, and a transformer. A complete combination consisting of battery, circuit interrupter, transformer, and electric discharge tube can be assembled in a very small space, and with proper adjustment, the batteries will have a life of several months. With appropriate modifications, an incandescent lamp can be substituted for the electrical discharge tube, and in either case, the light source is provided with a reflector and a suitable lens to direct the rays of light as desired.

It will be appreciated, however, that such a lens and reflector combination, even though designed to provide a fairly wide spread of the emergent light beams, is very inefficient as a warning reflector, except within a very narrow angle. Even within this angle, if a source of light is directed at the lens and reflector combination, a comparatively small amount of light is reflected back to an observer, and consequently, as heretofore produced, such devices do not operate satisfactorily as reflector-type warning devices.

It has long been known that certain materials fluoresce or give off visible light when subjected to ultraviolet radiation. The color of the fluorescent light is determined by the particular material used, and certain materials will fluoresce for a period of time after the ultraviolet light has ceased. Particularly in the case of the electrical discharge tube, the intermittent flashes of light heretofore available for warning signals have been of exceedingly short duration, and I have improved the operation of such devices by using a long-persistence fluorescent material in conjunction with the electrical discharge tube.

By the same token, it is possible to make use of phosphorescent materials that glow without the necessity of being activated by ultraviolet light. For example, the so-called "radium" numerals on watches and clocks will glow in the dark for a long period of time without any light shining upon them. The use of phosphorescent and fluorescent materials, combined with a new and improved lens and reflector assembly makes it possible to provide a warning signal that is more effective when illuminated in the usual manner, more efficient than prior devices when illuminated solely by external light, and visible when no external light falls upon it, and the normal light source within it is not operating.

It is therefore a major object of my invention to provide an improved visible warning and indicating device.

Another object of my invention is to provide such a device that furnishes an improved distribution pattern of light from a normal source, such as an incandescent lamp or an electrical discharge tube within the device.

It is a further object of my invention to provide a warning and signalling device of the described type having improved light-reflecting characteristics so that the device is very effective when external light shines upon it.

Still another object of my invention is to provide a device of this character that operates to provide a warning or indicating glow when the normal light source is not operating, and no external light shines upon the device.

It is a still further object of my invention to provide a light making use of an intermittently energized electrical discharge tube in which the visible radiation, while fluctuating in intensity, lasts for a greater period of time than the individual flashes of the tube itself.

These and other objects and advantages of my invention will become apparent from the following description of two forms thereof, and from the drawings illustrating those forms, in which.

Figure 1:
Fig. 1 is a perspective view of a warning sign such as may be used in construction work, with four of my improved warning and indicating lights thereon.

Referring now to the drawings, and particularly to Fig. 1 thereof, the numeral 10 indicates generally a warning sign provided with a plurality of warning and indicating lights 11 that are normally energized by a power and control source 12. It will be appreciated that warning signs and barricades of this general type are customarily used on construction projects, and electric power lines may not be conveniently located or available for energizing the warning lights. Furthermore, and particularly in the case of barricades and signs used in connection with construction projects, the warning or indicating light should be both self-contained and readily portable so that it may be moved from place to place as the need arises. To reduce the average power required by the lights 11, a flashing mechanism is usually incorporated within the power source 12 so that each lamp is lit only a small percentage of the time. In addition to the power saving, a flashing light has the added advantage that it compels attention more readily than a continuously energized light. However, it also increases the opportunities for failure of the warning or indicator light 11, either through failure of its incandescent bulb or similar member, or through failure of the equipment within the power source 12.

It will be appreciated that one of the primary requirements of a warning or indicator light 11 of this general type is that it provide a rather diffuse beam that is visible over a rather wide angle. One method of doing this is to provide a lens 13 that refracts and diffuses the light having its origin in the bulb or electrical discharge tube.

Figure 2:
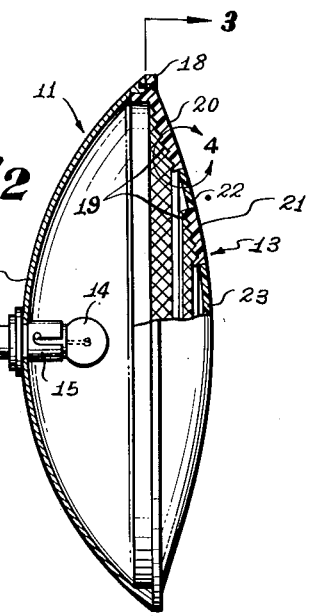
Fig. 2 is a cross sectional view of one of the lights, taken on the line 2—2 of Fig. 1 and showing the use of an incandescent bulb as a light source.
Figure 4:
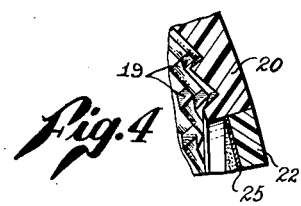
Fig. 4 is an enlarged fragmentary cross section of a portion of the lens, taken in the area 4 of Fig. 2.

For example, in Fig. 2 I have shown a warning or indicating light 11 intended primarily for use with an incandescent bulb 14 as its primary source of light. The bulb 14 is mounted in a socket 15 which in turn is connected by suitable wires 16 to the source of power 12, and a reflector 17 is mounted behind the bulb 14 to act in the customary manner. At the front or open end of the reflector 17 I mount the lens 13 and hold it in position in any suitable manner, as by a clamping ring 18. As hereinafter pointed out, the exterior of the lens 13 is preferably convex, and the rear or interior face is provided with a multitude of prisms or pyramids 19 that are molded or otherwise formed in the lens at the time of its manufacture. I have found that certain of the transparent plastics form a very suitable material for the lens 13, though it is to be understood that under certain conditions, glass or other material may be used if desired. In either case, the prisms 19 act as both reflectors and diffusing members so that light shining upon the exterior face of the lens 13 is reflected over a rather wide angle by the prisms.

Figure 3:
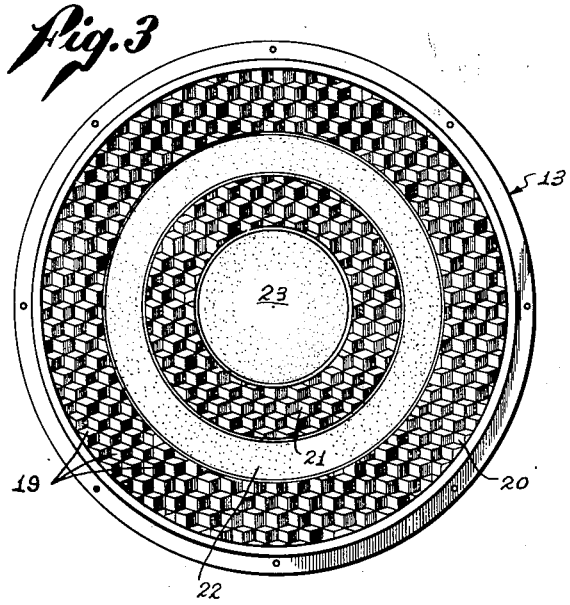
Fig. 3 is an elevational view of the rear of the lens used with my improved warning and indicating device, taken on the line 3—3 of Fig. 2.

Instead of completely covering the rear of the lens 13, the prisms 19 are formed in a series of concentric rings, such as the rings 20 and 21 shown in Fig. 3. While only two such rings are shown, a greater or lesser number may be used if desired. By the same token, while I have shown pyramidal prisms 19, it is to be recognized that other forms may be used, such as hemispheres, so long as the total refraction or reflection of a prism is obtained.

Between the concentric rings 20 and 21 is a substantially nondiffusing area 22 that conforms to the general shape of the lens 13, and from which the prisms 19 are omitted. A similar area 23 is provided in the center of the lens, and while these areas may reflect a slight amount of the inwardly directed external light rays, as compared with the rings 20 and 21, they may be considered as non-reflecting.

Warning and indicator lights are usually amber or red, while the light given by an ordinary incandescent globe is more nearly white. To provide the desired final color, I form the lens 13 of a suitably colored material, thus insuring that the light emitted from the device is of the proper color.

As previously suggested, the prisms 19 act as reflecting members so that external light falling upon the lens 13 passes through these reflecting rings 20 and 21 to the rear surface thereof, where it is reflected and passes out through the rings, being diffused or spread over a wide angle. As the outer surface of the lens 13 is made more convex, the effective angle of the lens becomes greater; that is, if the lens 13 is substantially flat or plano, light coming from a direction substantially perpendicular to the optical axis of the reflector 17 and lens 13 will not be reflected in an amount sufficient to attract the attention of a person standing approximately at the position of the light source. However, as the lens 13 is made more convex, the visibility of the device is greatly increased, since, among other things, the projected area of the lens visible to the observer and to the external light source is greater.

If the areas 22 and 23 are formed of a transparent plastic as suggested, external light falling upon these areas will pass through the lens 13 without substantial reflection, and the light will hit the mirror 17 and then be reflected outwardly. A certain amount of light will be transmitted through the reflecting rings 20 and 21, and will also strike the mirror 17. Under these circumstances, the light reflected from the mirror 17 acts in the same general manner as light from the incandescent globe 14 that also strikes the mirror. As a result, at least a portion of the light that is reflected from or redirected by the mirror 17 will pass through the reflecting rings 20 and 21 and be diffused thereby.

When an obstruction or danger area must be indicated and there is a possibility that no external light will be directed toward the warning or indicating device 11, I have found it advisable to use a phosphorescent material that glows without external energy being supplied to it. An example of such material is found in "radium" dials or numerals of clocks and watches, and materials of this general type are available that glow with different colors. While most of these products do not provide an amount of illumination sufficient to render them visible at great distances, they are visible at closer range, in time for a slower moving vehicle or a pedestrian to avoid the obstruction. It will be appreciated, of course, that almost any vehicle that is travelling at night will have some lights on it, and these will normally be sufficient to cause a certain amount of light to be reflected from the warning or indicating device. On the other hand, pedestrians normally do not carry lights, and consequently some method of indicating the presence of an obstruction must be provided that does not require the supplying of external energy. Some phosphorescent materials are activated by exposure to light, and glow with an increased intensity for a long period after the external light is removed. In this respect, these materials acts as storage materials, but do not require the presence of light nor the supplying of other energy during the time they are glowing.

One of the most convenient methods of applying the phosphorescent material is to coat the rear surface of the non-reflecting ring 22 with a thin coating 25 of a phosphorescent material. At other times it may be preferable to incorporate the phosphorescent material within the ring itself. The material normally should be one that glows with the same general color as the color of the reflecting rings 20 and 21, so that in the event these rings are colored red, the phosphorescent glow is also red. Preferably the coating 25 should be translucent so that light from the globe 14 may pass through the phosphorescent coating to add to the general illumination. However, even if the coating 25 is substantially opaque, at a distance the lens 17 will appear to be completely illuminated, with the opaque ring 22 disappearing from view.

Any rearwardly directed light from the phosphorescent material 25 will strike the reflector 17 and be redirected forwardly to pass through the reflecting rings 20 and 21. Since the color of the rings is substantially the color of the phosphorescent glow, the reflected light from the glow will pass through the reflecting rings with very little diminution or decrease in intensity. On the other hand, if the reflecting rings are amber or yellow, and if the phosphorescent material 25 gives off a bluish glow, very little light from the reflector 17 can be viewed through the reflecting rings 20 and 21. In certain cases there may well be a color contrast between the phosphorescent glow and the reflecting rings 20 and 21, but in general I prefer to have these as near the same color as possible.

The central non-reflecting area 23 may likewise be coated with a phosphorescent material 25, similar to the non-reflecting ring 22. However, I have found that in general better results are obtained if the non-reflecting circle 23 is not so coated. In this manner, light shining upon the warning and indicating device 11 may pass undiminished through the central non-reflecting circle 23, strike the reflector 17, and be redirected outwardly through the colored reflecting rings 20 and 21. When this happens, the intensity of the light from the device is greater than it would be if the central circle 23 were coated. It will be appreciated, of course, that if so desired, the central non-reflecting circle 23 can be coated with the phosphorescent material 25, and the non-reflecting ring 22 may be left clear.

Figure 5:
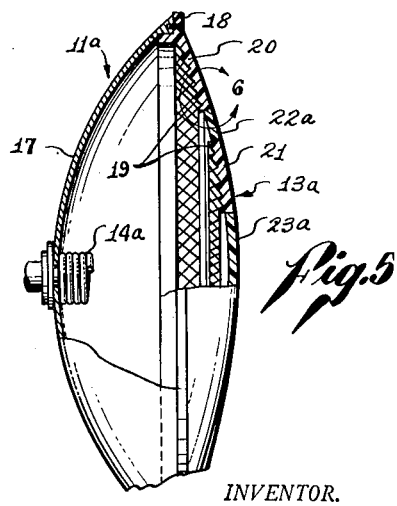
Fig. 5 is a cross sectional view, similar to Fig. 2, but indicating the use of an electrical discharge tube instead of an incandescent bulb.
Figure 6:
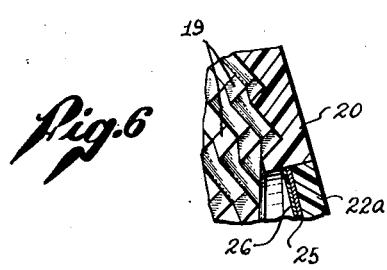
Fig. 6 is an enlarged fragmentary cross section of the lens used in connection with the electrical discharge tube, taken in the area 6 of Fig. 5.

In Figs. 5 and 6, I have indicated another form of my warning and indicating device, intended primarily for use with an electrical discharge tube instead of the incandescent globe 14. Electrical discharge tubes have the advantage that they are somewhat more efficient in the conversion of electricity to light, particularly in the production of colored light. Consequently, such tubes are very desirable and offer many advantages for self-contained units having their own power supply. Essentially, the indicating and warning device 11a, intended for use with an electrical discharge tube, is almost identical to the device 11 intended for use with an incandescent lamp. As indicated in Fig. 5, an electrical conduction tube 14a replaces the incandescent bulb 14, and a reflector 17 directs the light from the tube through a lens 13a. The latter is held in place by a clamping ring 18, and includes outer and inner reflecting rings 20 and 21, and a non-reflecting ring 22a therebetween. A central non-reflecting area 23a is located within the ring 21, the whole lens 13a being preferably formed of a synthetic plastic or similar material, like the previously described lens 13. Since the tube 14a is a source of colored, instead of white, light, the non-reflecting members 22a and 23a may be colorless, if desired.

As in the previously described form, the non-reflecting ring 22a may have a phosphorescent coating 25 applied to its rear surface, and a fluorescent coating 26 is also applied thereto. If desired, the phosphorescent and the fluorescent materials 25 and 26 may be combined and applied as a single coating. Both the phosphorescent and the fluorescent materials are selected so that they will glow with the same color as that of the reflecting rings 20 and 21. The central non-reflecting area 23a preferably is also coated with the fluorescent material 26, and if desired, the same fluorescent coating may be applied to the back of the reflecting rings 20 and 21. The fluorescent coating 26, while being translucent rather than transparent, is nevertheless available in forms that are sufficiently light permeable so that there is relatively little reduction of the intensity of visible light in its passage through the coating.

To activate the fluorescent coating 26 and cause it to glow, I form the electrical discharge tube 14a of an ultraviolet transmissive material of which several are available. Fused quartz, for example, transmits ultraviolet very well, and certain forms of glass are known and used in the production of electrical discharge tubes intended as a source of ultraviolet light. Within the tube itself there is a gaseous material that produces a fairly large amount of ultraviolet light, and if the visible light that accompanies the ultraviolet light is not of the desired color, the interior of the tube may be coated with a fluorescent material, similar to the fluorescent coating 26, so that the tube emits ultraviolet light, as well as visible light of the desired color.

The fluorescent material forming the fluorescent coating 26, and also the material in the interior of the tube of the electrical discharge tube 14a, is preferably one that has a long persistence. Such materials are known, and have the quality of glowing or fluorescing for a period of time after their direct activation by ultraviolet light has ceased. As a result, after the electrical discharge within he tube 14a has stopped, and the visible light from the discharge has ceased, the fluorescent material on the interior of the tube and in the fluorescent coating 26 will continue to glow so that the production of visible light is maintained after the ultraviolet light has ceased. As a result, instead of a bright flash of very short duration, the bright flash is followed by a period during which the intensity of the light gradually decreases, so that the effect is more that of a light source of fluctuating intensity, rather than a light source whose beam is interrupted. Better visibility and greater attention-compelling power of the warning and indicating signal is thus provided.

In other respects, the operation of the warning and indicating light shown in Figs. 5 and 6 is substantially identical with that of the previously described form. When the internal source of light, the discharge tube 14a, is not functioning, external light shining upon the device will be reflected from the reflecting rings 20 and 21 by reason of the prisms 19 on the rear surface thereof. Additionally, external light falling upon the non-reflecting areas 22 and 23 will pass through these areas to the reflector 17, from whence they will be redirected outwardly through the reflecting rings 20 and 21, all as previously described. In those cases where the internal light source has failed, through some fault of the power supply 12 or the electrical discharge tube 14a, and where no external light shines upon the device, the phosphorescent coating 25 on the non-reflecting ring 22 will glow to provide some visible indication of the presence of the device. In this way, a visible indication of the presence of the device is given under all conditions.

From the foregoing, it will be seen that I have provided a warning and indicating device that is fully capable of securing the advantages and achieving the objects heretofore set forth. It will be appreciated that modifications may be made in the device, such as changes in the relative position of the reflecting and non-reflecting members, but this change and others similar to it will occur to those skilled in the art. Consequently, while I have shown and described two forms of my invention, I do not wish to be restricted to the particular form or arrangement of parts herein described and shown, except as limited by the claims.

I claim:

1. An indicating device of the type described which includes: a light source; a reflector positioned to reflect the light from said source outwardly; and a lens in front of said reflector, having a first section provided with a series of light-reflecting prisms positioned and acting to diffuse and transmit outwardly directed light and to reflect inwardly directed light, and having a second section that is light transmissive and substantially non-reflecting, said second section acting to transmit inwardly directed light toward said reflector for redirection outwardly through said first and second sections.

2. An indicating device of the type described which includes: a light source; a reflector positioned to reflect the light from said source outwardly; and a lens in front of said reflector having a colored section completely covered with a series of light-reflecting prisms on its rear surface, said prisms being positioned and acting to diffuse and transmit outwardly directed light and to reflect inwardly directed light, said lens having another section that is substantially colorless and non-reflecting, said other section acting to transmit inwardly directed light toward said reflector for redirection outwardly thereby so that at least a portion of said redirected light passes through said colored section for diffusion thereby.

3. An indicating device of the type described which includes: a light source; a reflector positioned to reflect the light from said source outwardly; and a lens in front of said reflector having a plurality of spaced concentric ring sections each completely covered with a series of light-reflecting prisms on the rear surface thereof, said prisms being positioned and acting to refract and diffuse outwardly directed light and to reflect inwardly directed light, the portions of said lens between said ring sections being substantially non-reflecting and acting to transmit inwardly directed light toward said reflector for redirection outwardly thereby so that said redirected light passes through said non-reflecting portions and said ring sections for diffusion thereby.

4. An indicating device of the type described which includes: a light source; a reflector positioned to reflect the light from said source outwardly; a lens section in the form of a series of spaced concentric rings in front of said reflector and covering a portion of the area thereof, each of said rings being completely covered by a series of light-reflecting prisms on the rear surface thereof, said prisms being positioned and acting to refract and diffuse light directed outwardly from said reflector and to reflect external light directed inwardly toward said reflector; and a second lens section in front of said reflector, extending across the spaces between said rings, and being substantially non-reflecting, the rear surface of at least a portion of said second lens section being coated with a phosphorescent material, said second lens section acting to transmit external light to said reflector for redirection outwardly thereby through said rings and said second lens section.

5. An indicating device of the type described which includes: a light source emitting ultraviolet light; a reflector for visible and ultraviolet light, positioned to reflect the light from said source outwardly; and a lens in front of said reflector, having a first section completely covered with a series of light-reflecting prisms positioned and acting to diffuse and transmit outwardly directed light and to reflect inwardly directed light, and having a second section that is light transmissive and substantially non-reflecting, at least a portion of said lens having a fluorescent material activated by the ultraviolet light from said source, said second section acting to transmit inwardly directed light to said reflector for redirection thereby through said first and second sections.

6. An indicating device of the type described which includes: a light source emitting ultraviolet light; a reflector for visible and ultraviolet light, positioned to reflect the light from said source outwardly; and a lens in front of said reflector having a plurality of spaced concentric colored ring sections each covering a portion of the area of said reflector and being completely covered by a series of light-reflecting prisms on its rear surface, said prisms being positioned and acting to transmit and diffuse outwardly directed light and to reflect inwardly directed light, the remaining portions of said lens covering the remaining area of said reflector acting to transmit light in either direction without substantial reflection, inwardly directed light passing through said remaining portions being redirected by said reflector for transmission outwardly through said ring sections and said remaining portions, at least a portion of said lens having a fluorescent material adapted to be activated by the ultraviolet light from said source to fluoresce with a color similar to that of said colored ring sections.

7. In a warning and indicating device of the type having a light source and a reflector therefor, a lens in front of said reflector and including: a series of spaced concentric rings each being completely covered by a series of light-reflecting prisms on its rear surface positioned and acting to transmit and diffuse outwardly directed light and to reflect inwardly directed light; and non-reflecting sections between adjacent boundaries of said rings, said sections acting to transmit light therethrough in either direction, whereby inwardly directed light passing through said non-reflecting sections will be redirected by said reflector and transmitted outwardly through said rings and said non-reflecting sections.

8. In a warning and indicating device of the type having a light source and a reflector therefor, a lens in front of said reflector and including: a series of colored spaced concentric rings each being completely covered by a series of light-reflecting prisms on its rear surface positioned and acting to transmit and diffuse outwardly directed light and to reflect inwardly directed light, at least a portion of said rings carrying a fluorescent material; and a non-reflecting second section adapted to transmit light therethrough in either direction, whereby inwardly directed light passing through said second section is redirected by said reflector for transmission outwardly through said rings and said second section.

9. An indicating device of the type described which includes: a light source; a reflector positioned to reflect the light from said source outwardly; and a lens in front of said reflector and having a plurality of concentric sections, said sections being of two types, the first type being light transmissive and substantially non-reflecting, and the second type being provided with a plurality of light reflecting prisms on its rear surface, so positioned as to reflect inwardly directed external light and to transmit and diffuse outwardly directed light from said source and from said reflector, adjacent concentric sections being of different types, said sections cooperating with said reflector so that external light passing through a section of said first type is reflected by said reflector to pass out through both types of sections of said lens.

10. An indicating device of the type described which includes: a light source; a reflector positioned to reflect the light from said source outwardly; and a lens in front of said reflector having a minimum of three concentric sections, said sections being of two types, the first type being light transmissive and substantially non-reflecting, and the second type being of the reflex reflector type whose inner surface is covered with a plurality of light reflecting prisms, said second type section having the property of transmitting through itself and diffusing light first striking its inner surface, and reflecting and diffusing light first striking its outer surface, adjacent concentric sections of said lens being of different types, said sections cooperating with said reflector and each other so that external light passing through a section of said first type is reflected by said reflector to pass out through both types of sections of said lens.

11. An indicating device of the type described which includes: a light source; a reflector positioned to reflect the light from said source outwardly; and a lens in front of said reflector and source, having a minimum of three concentric sections, said sections being of two types, and adjacent sections being of different types, one of said types being light transmissive and substantially non-reflective, and the other of said types being completely covered on its inner surface with a multiplicity of pyramidal prisms so arranged and positioned as to reflect and somewhat diffuse external light first striking the outer surface of said section, and to transmit and diffuse light first striking the inner surface of said section, said sections cooperating with each other and said reflector so that light passing inwardly through said non-reflective type of section is reflected by said reflector and directed outwardly through both of said types of sections.

References Cited in the file of this patent

UNITED STATES PATENTS

| | | |
|---|---|---|
| D. 108,773 | Adler | Mar. 15, 1938 |
| 1,312,312 | Dodds | Aug. 5, 1919 |
| 1,675,431 | Sharp | July 3, 1928 |
| 1,840,098 | Hobson | Jan. 5, 1932 |
| 1,847,134 | Nikonow | Mar. 1, 1932 |
| 2,003,804 | Falge | June 4, 1935 |
| 2,067,701 | James | Jan. 12, 1937 |
| 2,147,914 | Morehead | Feb. 21, 1939 |
| 2,213,868 | Lucian | Sept. 3, 1940 |
| 2,287,221 | Alm | June 23, 1942 |
| 2,459,693 | Gordon | Jan. 18, 1949 |